Hubby, Jr.

[11] 3,740,117
[45] June 19, 1973

[54] ACOUSTO-OPTIC FILTER HAVING AN INCREASED OPTICAL BEAM APERTURE

[75] Inventor: Laurence M. Hubby, Jr., Palo Alto, Calif.

[73] Assignee: Hewlett-Packard Company, Palo Alto, Calif.

[22] Filed: July 22, 1971

[21] Appl. No.: 165,112

[52] U.S. Cl. ............... 350/149, 350/150, 350/152, 350/157, 350/161
[51] Int. Cl. .............................................. G02f 1/24
[58] Field of Search .................. 350/149, 150, 152, 350/157, 160–161

[56] References Cited
UNITED STATES PATENTS

| | | | |
|---|---|---|---|
| 1,358,413 | 11/1920 | Brodsky | 350/152 |
| 3,437,951 | 4/1969 | Dailey | 350/150 |
| 3,632,193 | 1/1972 | Kusters | 350/149 |
| 3,644,015 | 2/1972 | Hearn | 350/161 |

OTHER PUBLICATIONS

Harris et al., "CaMoO$_4$ Electronically Tunable Optical Filter" App. Phys. Lett. Vol. 17, No. 5 (1 Sept. 1970) pp. 223–225.

Primary Examiner—David Schonberg
Assistant Examiner—Michael J. Tokar
Attorney—Roland I. Griffin

[57] ABSTRACT

In an acousto-optic filter a prism, cut at a complimentary angle to the inclined input face of the photoelastic birefringent crystal, is disposed between the light source and the crystal. An index of refraction matching medium is disposed in a gap between the input face to the crystal and the parallel output face of the prism such that the input light beam, which is directed perpendicular to the input face of the prism is diffracted by the prism and by the index matching medium along a path within the crystal which is collinear with an excited acoustic wave within the crystal, whereby a maximum optical beam aperture size is obtained. A similar prism with an index of refraction matching medium is disposed at the output end of the crystal for retaining the maximum optical beam aperture at the output end of the filter.

16 Claims, 4 Drawing Figures

PATENTED JUN 19 1973 3,740,117

INVENTOR
LAURENCE M. HUBBY, JR.
BY Roland I. Griffen
ATTORNEY

ACOUSTO-OPTIC FILTER HAVING AN INCREASED OPTICAL BEAM APERTURE

DESCRIPTION OF THE PRIOR ART

Heretofore, electronically tunable acousto-optic bandpass filters have been constructed wherein light of a first polarization was collinearly diffracted on an acoustic wave within an optically birefringent photoelastic crystal to shift the polarization of the light, at a selected bandpass optical frequency, from the first polarization to the second polarization. The diffracted light was then polarization analyzed to separate the light of the second polarization from the light of the first polarization.

The input face of the photoelastic crystal was inclined at a substantial angle, as of 45°, to the longitudinal axis of the crystal such that an acoustic wave excited in the crystal by an acoustic transducer was reflected from the input face longitudinally of the crystal for collinear diffraction of the light beam passing axially of the crystal.

The problem produced by inclining the input face of the crystal for reflection of the acoustic wave is that the incident input light beam must then be inclined at a substantial angle to the longitudinal axis of the crystal for diffracting the input light beam along the longitudinal axis of the crystal. The divergence of the incident light beam with respect to the longitudinal axis of the crystal reduces the size of the effective optical beam aperture and thus reduces the amount of light that can be transmitted through the filter. This is known in the art as vignetting of the optical beam aperture. A similar effect occurs at the output face of the crystal which is preferably inclined at the Brewster angle to the longitudinal axis of the crystal to minimize reflection of the light beam at the output face of the photoelastic crystal.

An electronically tunable acousto-optic filter of this type is disclosed in an article titled "Acousto-Optic Tunable Filters" appearing in the Journal of the Optical Society of America, Volume 59, No. 6 of June, 1969, pages 744–747.

SUMMARY OF THE PRESENT INVENTION

The principal object of the present invention is the provision of an acousto-optic filter having an increased optical beam aperture.

In one feature of the present invention, a prism is spaced from the input face of the photoelastic birefringent medium of the acousto-optic filter and the input light beam is directed through the prism into the photoelastic medium with the input face of the prism being substantially perpendicular to the input light beam and with the output face of the prism being spaced from and inclined at the same angle as the input face of the photoelastic crystal of the acousto-optic filter, whereby the optical beam aperture of the acousto-optic filter is maximized. The space between the prism and the input face of the photoelastic crystal is preferably filled with an index of refraction matching medium to minimize reflection of light.

In another feature of the present invention, the index of refraction $n_2$ of the index matching medium between the input prism and the input face of the photoelastic crystal is related to the index of refraction $n_1$ of the prism and of the birefringent photoelastic crystal by the relation $n_2 = n_1 \tan \theta_1$, where $\theta_1$ is the angle between the axis of propagation of the acoustic wave and a perpendicular to the input face of the birefringent photoelastic crystal.

In another feature of the present invention, antireflective coatings are provided on the input and output faces of the input prism and on the input face of the photoelastic crystal to prevent unwanted reflection of light from the beam.

In another feature of the present invention, the output face of the photoelastic birefringent crystal is inclined at Brewster's angle to the optical beam axis through the photoelastic crystal, and an output prism having an output face and an input face is disposed adjacent to the output face of the photoelastic crystal with an index of refraction matching medium disposed between the output prism and the photoelastic crystal.

In another feature of the present invention, the input and output prisms are formed by slotting opposite ends of the photoelastic birefringent crystal which has parallel end faces perpendicular to the optical axis. The slots are inclined to the optical axis and are filled with an index of refraction matching medium.

Other features and advantages of the present invention will become apparent upon a perusal of the following specification taken in connection with the accompanying drawings.

DESCRIPTION OF THE PREFERRED EMBODIMENTS

Figure 1:
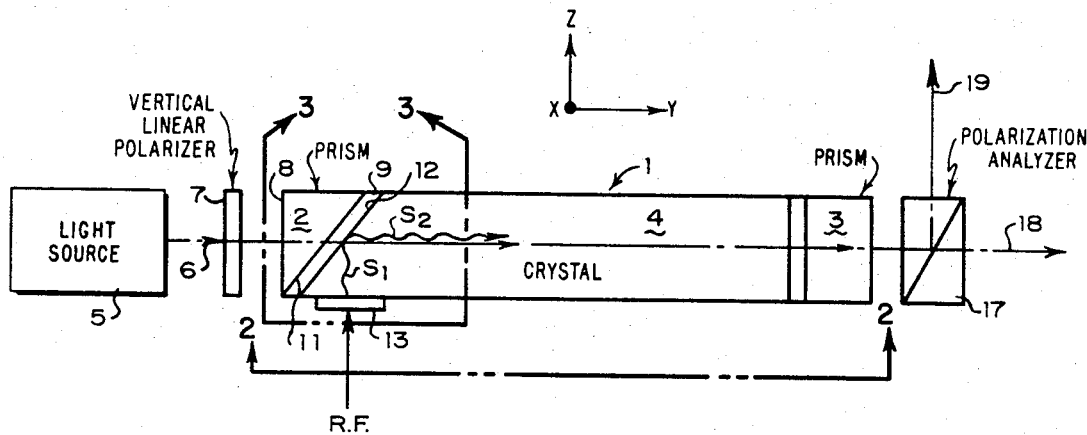
FIG. 1 is a schematic line diagram, partly in block diagram form, depicting an acousto-optic filter employing features of the present invention.
Figure 2:
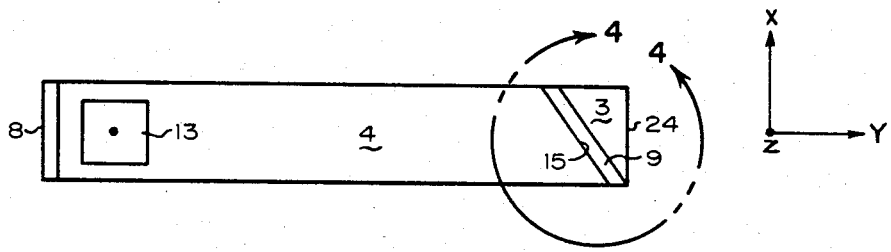
FIG. 2 is a side elevational view of a portion of the structure of FIG. 1 taken along line 2—2 in the direction of the arrows.

Referring now to FIGS. 1 and 2, there is shown an acoustooptic filter 1 incorporating features of the present invention. The acousto-optic filter is similar to that disclosed in the aforecited Journal of the Optical Society of America article with the exception that an input prism 2 and an output prism 3 have been provided at opposite ends of the birefringent photoelastic crystal 4 for increasing the beam aperture of the acousto-optic filter 1.

More specifically, the acousto-optic filter 1 includes a light source 5 which projects a beam of light 6 through a vertical linear polarizer 7 and thence through a prism 2 having an input face 8 and an output face 11. An index of refraction matching medium 9 is located between the output face 11 of the prism 2 and the input face 12 of the photoelastic birefringent crystal 4. The prism 2 and the index matching medium 9, in a manner more fully described below, causes the light beam 6 to be diffracted into crystal 4 along the longitudinal axis (Y axis) of the crystal 4. However, the Y axis is not necessarily the crystalline Y axis.

The input face 12 of crystal 4 is inclined at an angle to the Y axis such that an acoustic shear wave $S_1$ which is produced in the crystal 4 via the intermediary of an input acoustic transducer 13 is caused to be reflected, as shear wave $S_2$, off the internal surface of the input face 12 of the crystal 4 along a line generally parallel to the Y axis. Therefore, shear wave $S_2$ is traveling parallel to the light beam 6 for collinear diffraction of the light beam 6 on the acoustic shear wave $S_2$. The acoustic transducer 13 is driven by radio frequency energy derived from a tunable radio frequency oscillator, not shown.

For a particular combination of light wave and acoustic wave frequencies, there is found to be a strong interaction between the light and the acoustic wave in which the acoustic wave diffracts the light wave from the first polarization of the input beam 6 into an orthogonal second polarization. This yields a narrow band of light waves of the second polarization present in the beam of light of the first polarization.

Diffraction into the second orthogonal polarization occurs via a photoelastic constant of the crystal 4. In the case of a lithium niobate crystal 4, the photoelastic constant is, and such diffraction occurs only for a narrow band of optical frequencies $f_0$ which are related to the acoustic frequency $f_a$ via the expression:

$$f_0 = cf_a/V|\Delta n| \qquad (1)$$

where $c/V$ is the ratio of the light velocity in vacuum to the acoustic velocity in the crystal, and $|\Delta n|$ is the birefringence of the crystal.

In lithium niobate, the acousto-optic filter 1 is tunable from 7,000 to 5,500 A by changing the acoustic drive frequency from 750 to 1,050 MHz. A bandpass of less than 2 A is obtained for the band of optical frequencies diffracted from the input polarization into the orthogonal polarization with a crystal five centimeters long.

The collinearly diffracted light beam 6 is directed out of the crystal 4 through an output inclined face 15 (see FIG. 2), thence through a second layer of index of refraction matching medium 9, and through the output prism 3 to a polarization analyzer 17. The polarization analyzer, such as a Rochon or Glan-Taylor prism, separates the light of the first polarization from the light of the second orthogonal polarization. More particularly, light having a polarization orthogonal to the linear polarization of the input beam, namely, along the X-axis, passes through the polarization analyzer 17 as output beam 18. Output beam 18 has the typical optical bandpass characteristics, whereas the light of the same polarization as the input beam is reflected from the polarization analyzer as output beam 19. Output beam 19 has the typical band reject filter characteristics, where the reject band constitutes that portion of the input light which has been shifted from the first input polarization to the orthogonal second polarization and which passes through the polarization analyzer as output beam 18.

Crystal output face 15 has its normal lying in the X-Y plane, whereas input face 12 has its normal lying in the Z-Y plane. This 90° rotation of the plane of the input face 12 relative to the output face 15 of the photoelastic crystal 4 is utilized to produce a non-uniform spacing between the ends 12 and 15 of the crystal 4 and to shift the plane of the reflected waves by 90° relative to the incident waves to minimize the possibility of setting up a standing acoustic wave pattern within the photoelastic crystal 4. Such a standing acoustic wave would interfere with proper operation of the acousto-optic filter 1.

More particularly, a standing wave produces a resonance effect in the collinear diffraction at optical frequencies corresponding to an acoustic resonance of the crystal. As the acoustic wave of the acousto-optic filter is tuned through an acoustic resonance of the crystal an increase in the amount of light diffracted from the input polarization into the orthogonal polarization is obtained such that the output light beam intensity is frequency dependent. This frequency dependent output beam intensity is undesired in some cases and is minimized by preventing standing acoustic waves from being established within the photoelastic crystal 4.

Figure 3:
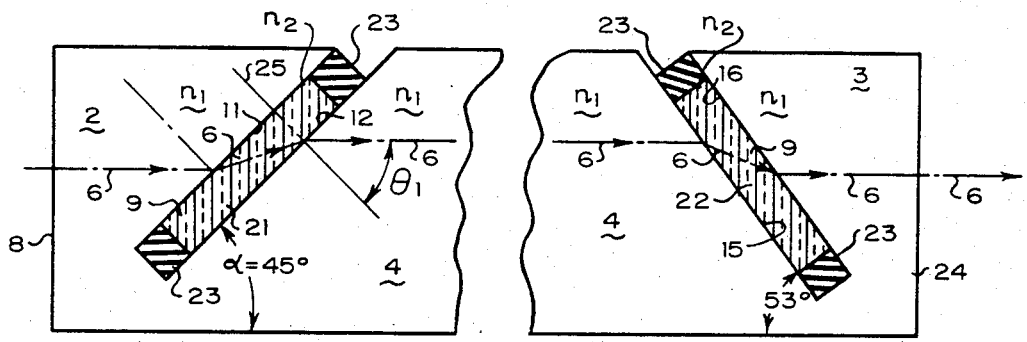
FIG. 3 is an enlarged detail view of a portion of the structure of FIG. 1 delineated by line 3—3.
Figure 4:
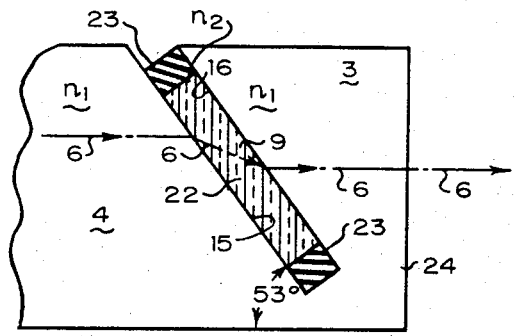
FIG. 4 is an enlarged detail view of a portion of the structure of FIG. 2 delineated by line 4—4.

Referring now to FIGS. 3 and 4, input and output prisms 2 and 3 and their effect upon the optical beam aperture will be described in greater detail. More specifically, the input and output prisms 2 and 3 are conveniently formed by slotting the opposite ends of the photoelastic birefringent crystal 4 with inclined slots 21 and 22 passing only partially through the crystal 4. In this manner, the slots 21 and 22 define the input prism 2 and the output prism 3 at opposite ends of the photoelastic crystal 4.

This slotting method of construction assures the prisms 2 and 3 are of identical material as that of the crystal and assures proper alignment of the optical axes of the prisms 2 and 3 and the photoelastic birefringent crystal 4.

The input and output prisms 2 and 3, with normal input and output faces 8 and 24, respectively, and inclined output and input faces 11 and 16, respectively, each parallel to the respective adjacent faces 12 and 15 of the crystal 4, assure that the light beam 6 will be diffracted into and out of the crystal 4 along a path parallel to the longitudinal axis thereof and normal to the input and output faces 8 and 24 of prisms 2 and 3.

The input slot 21 is inclined at an angle to reflect the acoustic wave $S_1$ into the path along the Y axis of the crystal 4. In the case of a $CaMoO_4$ photoelastic birefringent crystal 4, the proper angle for the input face 12 and, thus, slot 21 is 45° to the Y axis of the crystal 4.

The index of refraction $n_2$ for the index matching medium 9 is then determined from the following relation:

$$n_2 = n_1 \tan \theta_1 \qquad (2)$$

where $n_1$ is the index of refraction for the crystal 4 and for the input prism 2, $\theta_1$ is the angle between the axis of the light beam 6 (the Y axis), and the normal 25 to the input face 12 of the birefringent crystal 4. In a typical example, a $CaMoO_4$ crystal 4 has an index of refraction of approximately 2.0, and a suitable index matching medium 9 comprises Kodak HE-79 optical cement having an index of refraction $n_2 = 1.567$. In this example, a perfect index of refraction for $n_2$ is 2.0. However, this mismatch results in reflection of only 1.6 percent of the light.

Anti-reflection coatings are also preferably provided on the input and output faces 8 and 11 of prism 2 and on the input face 12 of the photoelastic crystal 4 to minimize such unwanted optical beam reflection from these surfaces and attendant loss of light.

In the case where the index matching medium is a liquid, a suitable gasket 23, such as fluoro-silicone rubber gasket, is positioned in the slot 21 for retaining the liquid therein. The gasket 23 may also be utilized with solid index matching media 9, such as optical cement for retaining the liquid cement in position until it hardens. The index matching media 9 should be optically transparent and should have a substantially different acoustical impedance than the crystal 4, such that an acoustical wave reflective discontinuity is presented to the acoustic wave face 12 of the crystal 4 whereby substantially all of the acoustic wave energy is reflected from the internal face 12 along the longitudinal or Y axis of the crystal 4.

At the output face 15 of crystal 4, slot 22 is cut at Brewster's angle which, in the case of a CaMoO$_4$ crystal, is 53° to the Y axis, such that substantially no light from the beam is reflected from the output face 15 of the crystal 4. The refractive index for the index matching fluid 9 at the output face is then determined from Eq. (2), where $\theta_1$ is the angle between the light beam within the crystal (Y axis) and a normal to the output face 15. The output face 24 of the output prism 3 is preferably coated with an anti-reflective coating to prevent loss of light from the beam by reflection in passage through the prism 3.

In a typical example, crystal 4 is 6 centimeters long, has a width of 8 millimeters and a depth of 8 millimeters and has an optical beam aperture of 6 millimeters in diameter as determined by the opening through the gaskets 23. The index matching medium is solidified Kodak HE-79 optical cement and the faces 12 and 15 are inclined at the angles shown in FIGS. 3 and 4. The slots 21 and 22 have a width of 0.020 inch and the acoustic transducer 13 is formed by a LiNbO$_3$ crystal operating in the shear mode over a range of frequencies from 30 to 60 MHz with an rf drive power of approximately 1 watt. The output beam 18 is tunable from 5,500 A to 6,300 A.

One advantage to the use of input and output prisms 2 and 3, as previously described, is the increase in the size of the beam aperture. In some cases, for acoustic reasons the input face 12 of the crystal must be cut at such an angle $\alpha$ that $\alpha$ exceeds the critical angle, namely, $\cos^{-1}(n_1/n_2)$, and in such a case the prisms 2 and 3 and the matching index fluid 9 are necessary in order to pass the light beam through the crystal 4.

The end prisms 2 and 3 and/or the index matching media 9 may be chosen to have regions of transparency differing from those of the photoelastic medium 4 in order to perform the function of a blocking filter. In another embodiment, the end prism materials may be chosen to have a refractive index or refractive indexes differing from those of the photoelastic medium by a particular amount, or one or both of the prisms may be cut at certain angles, to perform a desired amount of pre and/or post dispersion upon the light beam 6.

Also, one or both faces of the crystal 12 and 15 through which the optical beam passes may be made curved, and either or both end prisms may have curved faces in order to perform some amount of desired focusing.

In another embodiment, the index of refraction of the index matching media 9 are chosen to allow transmission of the light beam through any or all of the interfaces with the index matching fluid at or near Brewster's angle to minimize unwanted reflections.

In still another embodiment, the acoustic properties of the index matching media 9 are chosen to alter the acoustic beam pattern in some desired way, i.e., the acoustic loss of the index matching media in slot 22 is chosen to be high at the acoustic frequencies used in order to absorb acoustic waves which would otherwise be reflected from output face 15 back toward the transducer 13 to create an undesirable standing acoustic wave pattern in the crystal 4.

I claim:

1. A method for increasing the optical beam aperture of an acousto-optic apparatus, said method comprising the steps of passing an acoustic wave through a photoelastic birefringent medium along an acoustic wave path oriented at an angle to an inclined input face of the photoelastic birefringent medium, and passing an input light beam through a prism having an input face generally perpendicular to the incident light beam and having an output face generally parallel to and spaced from the inclined input face of the photoelastic birefringent medium, whereby the light beam is refracted at the output face of the prism at an angle to the axis of the acoustic wave path within the photoelastic birefringent medium and is refracted at the inclined input face of the photoelastic birefringent medium back into a path substantially collinear with the axis of the acoustic wave path within the photoelastic birefringent medium for collinear diffraction on an acoustic wave traveling along the acoustic wave path within the photoelastic birefringent medium.

2. The method of claim 1 including the step of disposing an index of refraction matching medium in the region between the output face of the prism and the input face of the photoelastic birefringent medium to minimize reflection of light.

3. The method of claim 2 wherein the prism and the photoelastic birefringent medium have essentially the same index of refraction $n_1$ and wherein the index of refraction $n_2$ of the index of refraction matching medium is approximately related to the index of refraction $n_1$ of the prism and the photoelastic birefringent medium by the relation:

$$n_2 = n_1 \tan \theta_1$$

where $\theta_1$ is the angle between the axis of the acoustic wave path and a normal to the input face of the photoelastic birefringent medium.

4. The method of claim 2 wherein the index of refraction matching medium is a liquid and the photoelastic birefringent medium is a crystal.

5. The method of claim 1 including the step of coating the input and output faces of the prism and the inclined input face of the photoelastic birefringent medium with an optically anti-reflective coating.

6. The method of claim 1 including the steps of forming an output face of the photoelastic birefringent medium at Brewster's angle to reduce optical reflection therefrom, and passing the light beam from the photoelastic birefringent medium through an output prism having an input face generally parallel to and spaced from the output face of the photoelastic birefringent medium and having an output face generally perpendicular to the axis of the acoustic wave path within the photoelastic birefringent medium, whereby the light beam passing through the output prism is refracted into a path generally parallel to the axis of the acoustic wave path within the photoelastic birefringent medium.

7. The method of claim 6 including the step of disposing an index of refraction matching medium in the space between the output face of the photoelastic birefringent medium and the input face of the output prism.

8. An acousto-optic filter comprising an optically birefringent medium having an inclined input face, an acoustic transducer for directing an acoustic wave into said birefringent medium and against said inclined input face to reflect the acoustic wave in said birefringent medium along a path of propagation defining an acoustic axis that is inclined at an angle to the normal of said inclined input face, and an input prism facing said inclined input face of said birefringent medium, said input prism having an input face generally perpendicular to the acoustic axis in said birefringent medium for receiving a beam of light and having an output face generally parallel to and spaced from said inclined input face of said birefringent medium for causing the light beam passing through said input prism to be directed to said inclined input face of said birefringent medium at such an angle as to cause the light beam to be directed into said birefringent medium along a path defining an optical axis of propagation that is generally collinear with the acoustic axis in said birefringent medium.

9. An acousto-optic filter as in claim 8 including an index of refraction matching medium disposed in the space between said output face of said input prism and said inclined input face of said birefringent medium to reduce reflection of the light beam.

10. An acousto-optic filter as in claim 9 wherein said input prism and said birefringent medium have essentially the same index of refraction $n_1$ and wherein the index of refraction $n_2$ of said index of refraction matching medium is approximately related to the index of refraction $n_1$ of said input prism and said birefringent medium by the relation:

$$n_2 = n_1 \tan \theta_1$$

where $\theta_1$ is the angle between the acoustic axis in said birefringent medium and the normal of said inclined input face of said birefringent medium.

11. An acousto-optic filter as in claim 9 wherein said index of refraction matching medium is a liquid and said birefringent medium is a crystal.

12. An acousto-optic filter as in claim 8 wherein said birefringent medium has an output face opposite said input face and inclined at approximately Brewster's angle to the optical axis in said birefringent medium, and wherein an output prism is spaced from said inclined output face of said birefringent medium, said output prism having an input face facing and spaced from said inclined output face of said birefringent medium in generally parallel relation thereto and having an output face generally perpendicular to the optical axis in said birefringent medium to cause the light beam passing from said birefringent medium through said output prism to be parallel to the optical axis in said birefringent medium.

13. An acousto-optic filter as in claim 12 including an index of refraction matching medium disposed in the space between said inclined output face of said birefringent medium and said input face of said output prism to reduce reflection of the light beam.

14. Acousto-optic filter apparatus comprising an optically birefringent crystal having opposite end faces generally perpendicular to the longitudinal axis of said birefringent crystal, opposite end regions of said birefringent crystal having slots inclined at an angle to the longitudinal axis of said birefringent crystal to define a pair of prisms, one at each end of said birefringent crystal, and an acousto-optic filter crystal in the region intermediate said pair of prisms.

15. Acousto-optic filter apparatus as in claim 14 including an acoustic transducer coupled to the side of said acousto-optic filter crystal adjacent to one end thereof for directing acoustic wave energy against an internal end face of said acousto-optic filter crystal.

16. Acousto-optic filter apparatus as in claim 14 wherein at least one of said slots is inclined at Brewster's angle to the longitudinal axis of said birefringent crystal.

* * * * *